United States Patent
Bommas et al.

(10) Patent No.: US 8,244,304 B2
(45) Date of Patent: Aug. 14, 2012

(54) METHOD FOR SYNCHRONIZATION OF ASSEMBLIES IN A BASE STATION

(75) Inventors: Helmut Bommas, Ulm (DE); Armin Splett, Ulm (DE)

(73) Assignee: Nokia Siemens Networks GmbH & Co. KG, Munich (DE)

(*) Notice: Subject to any disclaimer, the term of this patent is extended or adjusted under 35 U.S.C. 154(b) by 647 days.

(21) Appl. No.: 12/226,724

(22) PCT Filed: Mar. 30, 2007

(86) PCT No.: PCT/EP2007/053127
§ 371 (c)(1),
(2), (4) Date: Mar. 5, 2009

(87) PCT Pub. No.: WO2007/124995
PCT Pub. Date: Nov. 8, 2007

(65) Prior Publication Data
US 2009/0238154 A1 Sep. 24, 2009

(30) Foreign Application Priority Data
Apr. 26, 2006 (DE) .......................... 10 2006 019 475

(51) Int. Cl.
*H04B 1/38* (2006.01)
*H04M 1/00* (2006.01)
(52) U.S. Cl. ............... 455/561; 455/276.01; 370/350
(58) Field of Classification Search ............ 455/67.12, 455/276.01, 561; 370/350
See application file for complete search history.

(56) References Cited

U.S. PATENT DOCUMENTS

| | | | |
|---|---|---|---|
| 4,696,052 A | 9/1987 | Breeden | |
| 5,062,124 A | 10/1991 | Hayashi et al. | |
| 5,483,677 A | 1/1996 | Brydon et al. | |
| 5,544,324 A * | 8/1996 | Edem et al. | ............. 709/231 |
| 6,839,391 B2 * | 1/2005 | Novak et al. | ............. 375/354 |
| 6,907,224 B2 * | 6/2005 | Younis | ............. 455/12.1 |
| 7,239,650 B2 * | 7/2007 | Rakib et al. | ............. 370/480 |
| 7,495,516 B2 * | 2/2009 | Travis | ............. 331/2 |
| 2005/0286507 A1 | 12/2005 | Österling et al. | |

FOREIGN PATENT DOCUMENTS

| | | |
|---|---|---|
| EP | 1 519 505 A2 | 3/2005 |
| EP | 1 630 979 A1 | 3/2006 |
| WO | 00/38361 | 6/2000 |
| WO | 01/55803 A2 | 8/2001 |
| WO | 2004/030241 A1 | 4/2004 |
| WO | 2006/040653 A1 | 4/2006 |

OTHER PUBLICATIONS

"CPRI Specification V2.0 (Oct. 1, 2004)" Internet Citation, [online] Oct. 1, 2004, XP002359217 found on the internet: URL: http://www.cpri.online/>[found on Dec. 15, 2005].

* cited by examiner

*Primary Examiner* — Nhan Le
(74) *Attorney, Agent, or Firm* — Staas & Halsey LLP

(57) ABSTRACT

A method synchronizes assemblies in a base station to a reference clock signal. A local clock signal and a frame are formed in a first assembly. The clock signal and the frame are transmitted, using a synchronous transmission with a predictable propagation time, to a second assembly. A reference clock signal is received in the second assembly, and a phase difference and a time difference between the transmitted clock signal on the one hand and the reference clock signal on the other hand are determined. The phase difference and the time difference are transmitted from the second assembly to the first assembly via a link without a predictable propagation time. The phase difference and the time difference are used in the first assembly to determine a manipulated variable which controls the formation of the local clock signal, such that the first and the second assemblies are synchronized in time.

19 Claims, 2 Drawing Sheets

METHOD FOR SYNCHRONIZATION OF ASSEMBLIES IN A BASE STATION

CROSS REFERENCE TO RELATED APPLICATIONS

This application is based on and hereby claims priority to German Application No. 10 2006 019 475.6 filed on Apr. 26, 2006 and PCT Application No. PCT/EP2007/053127 filed on Mar. 30, 2007, the contents of which are hereby incorporated by reference.

BACKGROUND OF THE INVENTION

The invention relates to a method for synchronization of assemblies in a base station with a reference clock signal.

It is known for a so called "master oscillator" that must have a high absolute frequency accuracy to be used to synchronize remote units or assemblies in a base station. In this case, the oscillator is tuned via a phase-locking loop to a reference signal of a generally external reference source.

For example, a GPS ("Global Positioning System") signal that is received via a GPS antenna is used as reference for an absolute time accuracy or phase accuracy. The GPS antenna is usually arranged in this case near a transceiving antenna in the base station. The received GPS signal must then usually be led to the master oscillator via a relatively long path by using a transmission link or line specifically provided therefor. This generally takes place together with a substantial signal damping owing to the line length. In addition, high costs are caused by the line length and by an additional outlay on line installation costs.

These disadvantages are significant, particularly in the case of spatially separated assemblies in a base station that is designed as a tower mounted radio arrangement. In this case, a first assembly, denoted as a radio head, is arranged close to the antenna, while further assemblies are arranged remote from the antenna. It is correspondingly necessary for both the remote first assembly and the remaining assemblies to be synchronized in time with the reference signal in a highly precise fashion.

SUMMARY

It is therefore one potential object to specify a method for a highly precise time synchronization of distributed assemblies in a base station that can be implemented cost effectively with the smallest possible outlay.

The inventors propose a method, in which a local clock signal and a frame are formed by a first assembly. The clock signal and the frame are transmitted to a second assembly by using a synchronous transmission with a predictable propagation time. A reference clock signal is received by the second assembly, and a phase difference and a time difference are determined between the transmitted clock signal, on the one hand, and the reference clock signal, on the other hand.

The phase difference and the time difference are transmitted from the second assembly to the first assembly via a link without a predictable propagation time. The phase difference and the time difference are used by the first assembly to determine a manipulated variable, the manipulated variable controlling the formation of the local clock signal in such a way that the first and second assemblies are synchronized in time.

A transmission line provided for the exclusive transmission of the highly accurate reference signal can be saved with the aid of the proposed method.

In an advantageous development, the time synchronization is performed by using a CPRI interface or a CPRI network that is present in any case between the assemblies for transmitting data signals and control signals.

Distances of up to 10 kilometers can be bridged with the aid of a CPRI interface.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
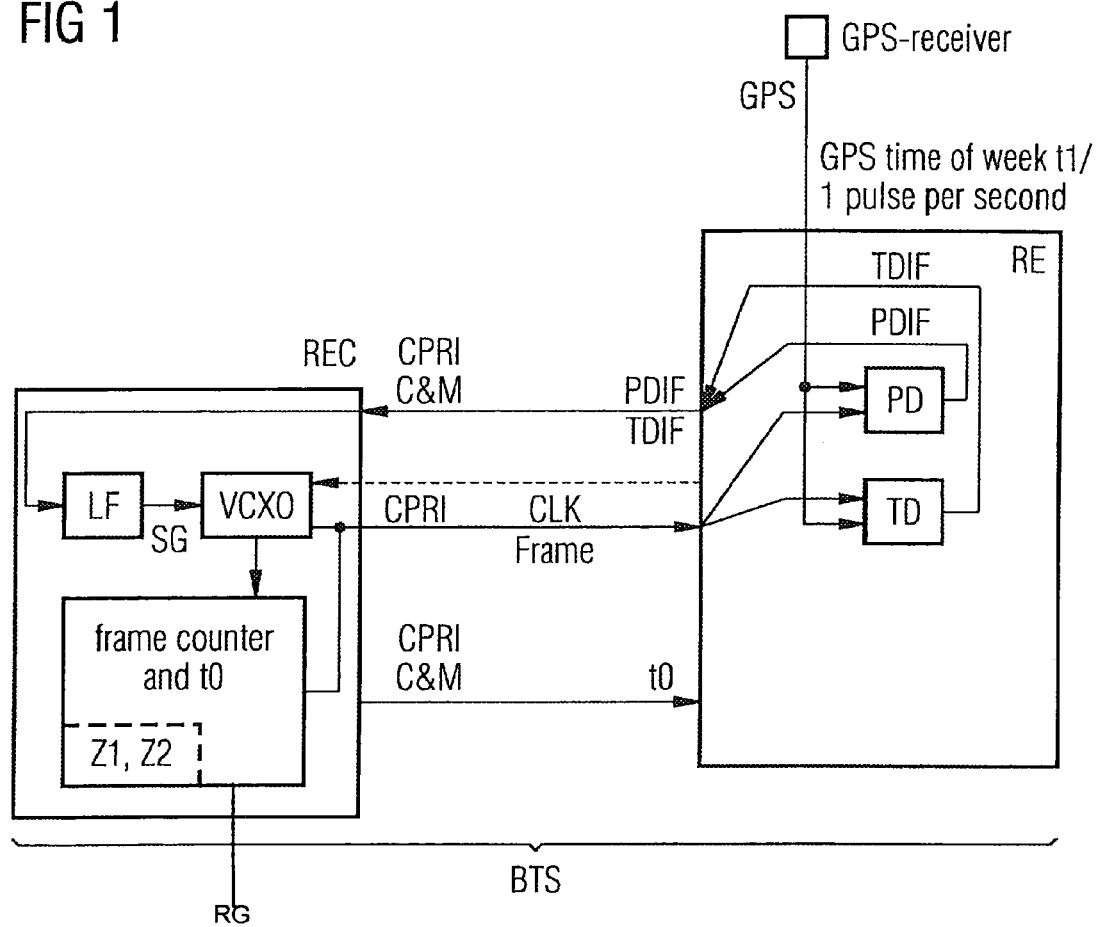
FIG. 1 shows a first exemplary embodiment of the proposed method.

Reference will now be made in detail to the preferred embodiments of the present invention, examples of which are illustrated in the accompanying drawings, wherein like reference numerals refer to like elements throughout.

FIG. 1 shows a first exemplary embodiment of the method proposed by the inventors.

A first assembly REC and a second assembly RE in a base station BTS are preferably interconnected via a network CPRI. The CPRI network enables synchronous transmission of signals with a predictable propagation time between the assemblies RE and REC.

The first assembly REC includes an oscillator VCXO and a frame generator RG, a local clock signal CLK being formed with the aid of the oscillator VCXO, and a Frame being formed with the aid of the frame generator RG.

The local clock signal CLK and the Frame are transmitted to a second assembly RE by using synchronous transmission with a predictable propagation time.

A layer 1 protocol of the CPRI network is preferably used to transmit the clock signal CLK and the frame.

A reference clock signal GPS is received by the second assembly RE via a GPS receiver.

The second assembly RE includes a phase indicator PD and a time indicator TD with the aid of which a phase difference PDIF and a time difference TDIF are determined between the transmitted clock signal CLK, on the one hand, and the reference clock signal GPS, on the other hand.

The phase difference PDIF and the time difference TDIF are transmitted via a link without a predictable propagation time from the second assembly RE to the first assembly REC.

This transmission is preferably carried out as packet data transmission by using an Internet protocol.

The link without a predictable propagation time is preferably designed as a control & management channel (C&M) of the CPRI network.

The phase difference PDIF and the time difference TDIF are used by the first assembly REC to determine a manipulated variable SG with the aid of which the formation of the local clock signal CLK is controlled. This control is performed in such a way that time synchronization of the first assembly REC and the second assembly RE is carried out.

A temporal frequency with which the measurement results of phase difference PDIF and time difference TDIF are received by the first assembly REC is preferably determined. This frequency is additionally considered when determining the manipulated variable.

In a preferred development, the instants of the measurements of the phase difference PDIF and the time difference TDIF are marked with a frame number and transferred to the first assembly REC in order to be able to consider these instants when determining the manipulated variable of the oscillator VCXO.

By way of example, the GPS receiver transmits a time signal GPS in the form of a pulse per second to the second assembly RE. As an alternative thereto, a time signal designated as "GPS time of week t1" can be transmitted as time of week t1 to the second assembly RE.

The first assembly REC connects upstream of the oscillator VCXO a loop filter LF for forming the manipulated variable SG through which the time difference TDIF and the phase difference PDIF pass.

The oscillator VCXO can be designed, for example, as an oven quartz.

The master oscillator VCXO is connected on the output side to a counting unit "frame counter and t0" that firstly counts oscillatory periods of the master oscillator VCXO inside a frame "frame".

For example, a UMTS frame "frame" of temporal length 10 ms is used in a UMTS radio communication system. At an oscillatory frequency of 38.4 MHz, the counting unit "frame counter and t0" counts from a value "0" to "383999" in a first part, and then begins to count anew starting from the value "0". The counting unit "frame counter and t0" has a first counter Z1 for this purpose.

In a second part, the counting unit "frame counter and t0" now counts frames "frame", a second counter Z2 of the counting unit "frame counter and t0" being incremented. The incrementation always takes place when the first counter Z1 jumps from the abovenamed value "383999" to the value "0".

In the case of the exemplary UMTS radio communication system, the second counter Z2 would count from the value "0" up to a value of "4095", and thereby indicate a "node B frame number, BFN" that is defined in 3GPP TS 25.402 and is used in the CPRI standard.

A time variable t0 is managed in a third part of the counting unit "frame counter and t0". In the exemplary UMTS radio communication system, the time variable t0 is always incremented by a value of "40.96 sec" when the second counter Z2 jumps from the value "4095" to the value "0".

The first counter Z1, which counts the values from "0" to "383999", the second counter Z2, which counts the values from "0" to "4095" and the time variable t0 constitute a time of day system.

The time variable t0 is transmitted to the time indicator TD, this transmission preferably being performed via the CPRI channel "C&M".

Figure 2:
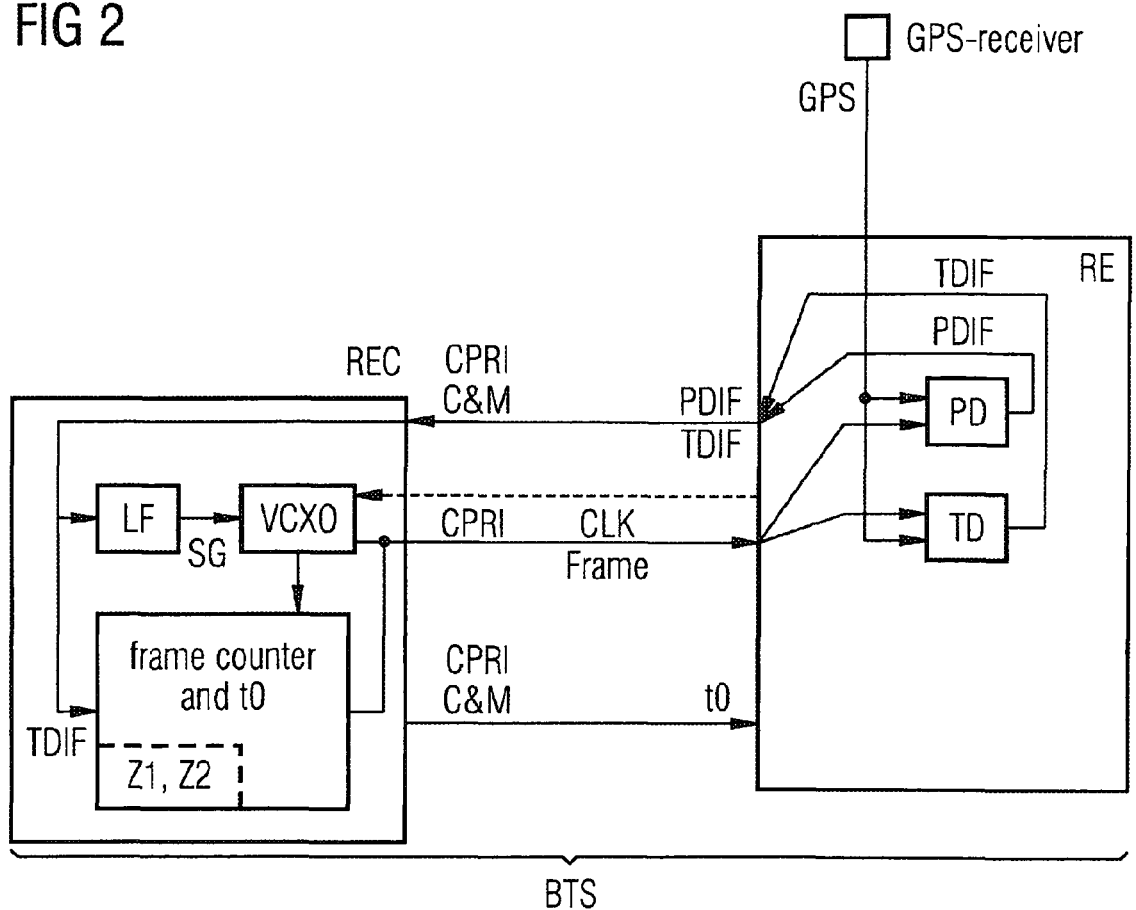
FIG. 2 shows a second exemplary embodiment of the proposed method.

The time of day system can be referred to a time of week "GPS time of week" t1 or to a GPS time t1 and/or to the coordinated world time (UTC). Two exemplary options are described in more detail below in this instance:

In a first refinement in accordance with FIG. 2, there is an assignment to the GPS time t1, which is determined by the time indicator TD, for the counter contents of the first counter Z1="0" and of the second counter Z2="0" for each time variable t0.

For this purpose, the counter contents of the first counter Z1 and of the second counter Z2 are transmitted to the time indicator TD via the CPRI frame information BFN in accordance with the standard CPRI, version V2.0. Moreover, the time variable t0 is transmitted to the time indicator TD, this transmission preferably being performed via the CPRI channel "C&M".

In a second refinement, the counting unit "frame counter and t0" is specifically reset on the basis of an item of information of the time indicator TD.

This resetting can be performed by using the time difference "TDIF".

For example, the counter content of the first counter is set to the value "0", while the counter content of the second counter is set to the value "0" for BFN=Z2="0".

Owing to the specific resetting of the CPRI frame "frame" with the time of week t1, a synchronization is carried out in such a way that a CPRI frame "frame" begins exactly at the beginning of each second of the time of week t1. In the example, this is performed whenever the first counter jumps from the value "383999" to the value "0".

Moreover, a counter content of the first counter Z1 and of the second counter Z2 can be uniquely defined for each GPS time t1, the counter content of the second counter being defined via the "node B frame number, BFN".

A plurality of base stations can be synchronized by the counter contents of the first and second counters Z1, Z2. In this case, the specific resetting is performed in such a way that the counter contents of the first and second counters are set to the value "0" in a defined fashion at a time defined as the same for all base stations.

For example, to this end a time point "Monday, 01.01.2007, 0:00'00" hr" is selected. The resetting can be performed not only on "Monday, 01.01.2007, 0:00'00" hr", but can be performed at any desired integral multiple of 40.96 sec after this "Monday 0:00'00" hr".

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for synchronization of assemblies in a base station with a reference clock signal, comprising:
    forming a local clock signal and a frame by a first assembly;
    transmitting the local clock signal and the frame to a second assembly by using a synchronous transmission with a predictable propagation time;
    receiving the reference clock signal at the second assembly;
    determining a phase difference and a time difference at the second assembly, the phase difference and the time difference being determined between the local clock signal and the frame, on the one hand, and the reference clock signal, on the other hand;
    transmitting the phase difference and the time difference from the second assembly to the first assembly via a link without a predictable propagation time; and
    using the phase difference and the time difference at the first assembly to determine a manipulated variable that controls formation of the local clock signal such that the first and second assemblies are synchronized in time.

2. The method as claimed in claim 1, wherein
    a phase indicator and a time indicator are used by the second assembly in order to determine the phase difference and the time difference, and/or an oscillator and a frame generator are used by the first assembly in order to form the local clock signal and the frame.

3. The method as claimed in claim 1, wherein a Global Positioning System (GPS) signal is received as the reference clock signal, by the second assembly.

4. The method as claimed in claim 1, wherein a Common Public Radio Interface (CPRI) network is used for synchronous transmission of the local clock signal and the frame with a predictable propagation time.

5. The method as claimed in claim 4, wherein
the CPRI network has a layer 1 protocol, and
the layer 1 protocol of the CPRI network is used to transmit the local clock signal and the frame.

6. The method as claimed in claim 1, wherein the phase difference and the time difference are transmitted as packet data via the link without a predictable propagation time.

7. The method as claimed in claim 6, wherein an Internet protocol is used to transmit the packet data.

8. The method as claimed in claim 6, wherein
a Common Public Radio Interface (CPRI) network connects the first and second assemblies,
the CPRI network has a control & management (C&M) channel, and
the C&M channel of the CPRI network is used to transmit the phase difference and the time difference in data packets.

9. The method as claimed in claim 1, further comprising:
determining a temporal frequency with which the phase difference and time difference are received by the first assembly; and
using the temporal frequency when determining the manipulated variable.

10. The method as claimed in claim 1, further comprising:
marking each instantaneous determination of the phase difference and the time difference with a frame number; and
using the frame number when determining the manipulated variable, wherein the manipulated variable is determined at the first assembly in an oscillator.

11. The method as claimed in claim 1, wherein
the reference clock signal is a global positioning system (GPS) signal,
the second assembly is provided with a main transceiver antenna,
the first assembly is provided with a master oscillator, and first and second assemblies are spatially remote from each other.

12. The method as claimed in claim 2, wherein a Global Positioning System (GPS) signal is received as the reference clock signal, by the second assembly.

13. The method as claimed in claim 2, wherein the phase difference and the time difference are transmitted as packet data via the link without a predictable propagation time.

14. The method as claimed in claim 13, wherein an Internet protocol is used to transmit the packet data.

15. The method as claimed in claim 14, wherein
a Common Public Radio Interface (CPRI) network connects the first and second assemblies,
the CPRI network has a control & management (C&M) channel, and
the C&M channel of the CPRI network is used to transmit the phase difference and the time difference in data packets.

16. The method as claimed in claim 15, further comprising:
determining a temporal frequency with which the phase difference and time difference are received by the first assembly; and
using the temporal frequency when determining the manipulated variable.

17. The method as claimed in claim 16, further comprising:
marking each instantaneous determination of the phase difference and the time difference with a frame number; and
using the frame number when determining the manipulated variable, wherein the manipulated variable is determined at the first assembly in an oscillator.

18. An assembly in a base station, comprising:
a phase indicator and a time indicator to receive a local clock signal and a frame using a synchronous transmission with a predictable propagation time, and to receive a reference clock signal, for determining a phase difference and a time difference between the local clock signal and the frame, on the one hand, and the reference clock signal, on the other hand;
means for determining the phase difference and the time difference, and
a transmitter to transmit the determined phase difference and the determined time difference via a link without a predicable propagation time for synchronization.

19. An assembly according to claim 18 wherein:
the phase indicator and the time indicator receive the local clock signal and the frame formed within other assembly of the base station distinct to the assembly and transmitted by the other assembly of the base station using a synchronous transmission with a predicable propagation time, and
the transmitted phase difference and time difference are used to determine a manipulated variable that controls formation of the local clock signal such that the assemblies of the base station are synchronized in time.

* * * * *